United States Patent
Takada et al.

(10) Patent No.: US 9,740,423 B2
(45) Date of Patent: Aug. 22, 2017

(54) COMPUTER SYSTEM

(71) Applicant: Hitachi, Ltd., Tokyo (JP)

(72) Inventors: Masanori Takada, Tokyo (JP); Nobuhiro Yokoi, Tokyo (JP); Sadahiro Sugimoto, Tokyo (JP); Akira Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/772,887

(22) PCT Filed: Jul. 26, 2013

(86) PCT No.: PCT/JP2013/070378
§ 371 (c)(1),
(2) Date: Sep. 4, 2015

(87) PCT Pub. No.: WO2015/011835
PCT Pub. Date: Jan. 29, 2015

(65) Prior Publication Data
US 2016/0132271 A1    May 12, 2016

(51) Int. Cl.
G06F 3/06    (2006.01)

(52) U.S. Cl.
CPC ............ *G06F 3/0644* (2013.01); *G06F 3/061* (2013.01); *G06F 3/0604* (2013.01); *G06F 3/0659* (2013.01); *G06F 3/0671* (2013.01); *G06F 3/0673* (2013.01)

(58) Field of Classification Search
CPC ....... G06F 3/061; G06F 3/0659; G06F 3/0673
See application file for complete search history.

(56) References Cited

U.S. PATENT DOCUMENTS

| 2004/0044857 | A1* | 3/2004 | Jeddeloh | G06F 13/1673 711/154 |
| 2008/0005511 | A1* | 1/2008 | Laudon | G06F 13/1668 711/163 |
| 2011/0296129 | A1 | 12/2011 | Arai et al. | |

(Continued)

FOREIGN PATENT DOCUMENTS

WO    2011151859 A1    8/2011

OTHER PUBLICATIONS

International Search Report of PCT/JP2013/070378.

*Primary Examiner* — Edward Dudek, Jr.
(74) *Attorney, Agent, or Firm* — Mattingly & Malur, PC

(57) ABSTRACT

In a computer system having a storage controller that receives a read request or a write request, a processor is configured to send to an interface device either a read-support indication, which is an indication to execute either all or a portion of read processing for read-data of the read request, or a write-support indication, which is an indication for either all or a portion of write processing for write-data of the write request. Then, the interface device, in accordance with either the read-support indication or the write-support indication, is configured to execute either all or a portion of the read processing for the read-data, or all or a portion of the write processing for the write-data, and to send to a host computer either a first response to the effect that the read processing has been completed, or a second response that the write processing has been completed.

13 Claims, 14 Drawing Sheets

(56) References Cited

U.S. PATENT DOCUMENTS

2013/0073795 A1\* 3/2013 Hasegawa ............... G06F 13/16
　　　　　　　　　　　　　　　　　　　　　　　　711/103
2015/0149735 A1\* 5/2015 Nale ..................... G06F 11/079
　　　　　　　　　　　　　　　　　　　　　　　　711/147

\* cited by examiner

42

| Volume number (421) | LBA (422) | CM address (423) | Dirty (424) |
|---|---|---|---|
| 0 | 0x100 | 0x3600 | N |
| 0 | 0x200 | 0x1400 | Y |
| 1 | 0x200 | 0x0c00 | Y |
| 1 | 0x600 | 0x0400 | Y |
| ... | ... | ... | ... |

Fig.8

COMPUTER SYSTEM

TECHNICAL FIELD

The present invention relates to transferring data in a computer system.

BACKGROUND ART

A technique called big data analysis that produces value by analyzing enormous amounts of data generated via social activities is in widespread use. As a result, storage systems featuring even higher performance are required.

In particular, in order to guarantee system reliability, storage systems must not lose data even when a hardware failure occurs. Consequently, write data must be stored inside a storage system using multiplexing, and it is preferable that the write performance of the storage apparatus be improved.

For example, as a technique for improving the write performance of a storage apparatus with a duplexed storage controller, a technique, in which data is received from a host computer in accordance with a write request, and after the processor has stored this data in the memory of the one storage controller, Direct Memory Access (DMA) reads the data from this memory in accordance with a processor indication, and copies the data to the memory of the other storage controller, and automatically confirms that the data has been copied to the copy-destination memory by issuing a dummy read request to the copy-destination memory, is known (PTL 1).

CITATION LIST

Patent Literature

PTL 1
WO2011/151859

SUMMARY OF INVENTION

Technical Problem

In the aforementioned prior art, the load on the storage controller processor can be reduced by automating the data duplexing process so as not to go through the processor for data that has been written to memory one time by the processor.

However, the processor receives the data in accordance with the write request received from the host computer and stores this data one time in one of the memories in the storage apparatus. Thus, the load on the processor is not adequately reduced. In particular, due to the large data capacity, the load on the processor when sending and receiving data is greater than that in other steps. In addition, the processing subsequent to duplexing the data that conforms to the write request in two memories and confirming that the data has reached the memories must be performed consecutively by the processor. Therefore, as a result of these processes, performance is not adequately enhanced.

Solution to the Problem

A computer system comprises a storage controller having a temporary storage area and a processor that has an arithmetic logical unit, and an interface device that is coupled to the storage controller and is configured to send either a read request or a write request from a host computer to the storage controller. When the storage controller has received a read request or a write request, the processor is configured to send to the interface device either a read-support indication, which is an indication to execute either all or a portion of read processing for read-data conforming to a read request, or a write-support indication, which is an indication for either all or a portion of write processing for write-data conforming to the write request. Then, the interface device, in accordance with either the read-support indication or the write-support indication from the storage controller, is configured to execute either all or a portion of the read processing for the read-data, or all or a portion of the write processing for the write-data, and to send to the host computer either a first response to the effect that the read processing has been completed, or a second response to the effect that the write processing has been completed.

Advantageous Effects of Invention

The present invention reduces the load on the storage controller processor, and improves the read/write performance of the computer system.

BRIEF DESCRIPTION OF DRAWINGS

FIG. 8 is a drawing showing the configuration of a cache directory 42.

DESCRIPTION OF EMBODIMENTS

The present invention relates to a technique for improving performance in a computer system that includes a storage system.

A computer system related to a number of embodiments of the present invention will be described hereinbelow by referring to the attached drawings. However, it should be noted that these embodiments are merely examples for realizing the present invention, and do not limit the technical scope of the present invention. Also, the same reference signs are assigned to configurations shared in common in the respective drawings. Multiple components of the same type are individually distinguished by assigning an alphabetic character at the end of a numeral, such as 999a, 999b, and so forth, but these components may be described by omitting the alphabetic characters as necessary.

In the following description, as necessary, a read request and a write request may be referred to generically as a "read/write request", and a read process conforming to a read request and the write process conforming to a write request may be referred to generically as a "read/write process". That is, the term "read/write" refers to either a read or a write.

In the following description, as necessary, data conforming to a write request may be referred to as write-data, and data conforming to a read request may be referred to as read-data. Furthermore, in a case where there is no particular need to be specific, such data will be referred to simply as data.

Embodiment 1

Figure 1:
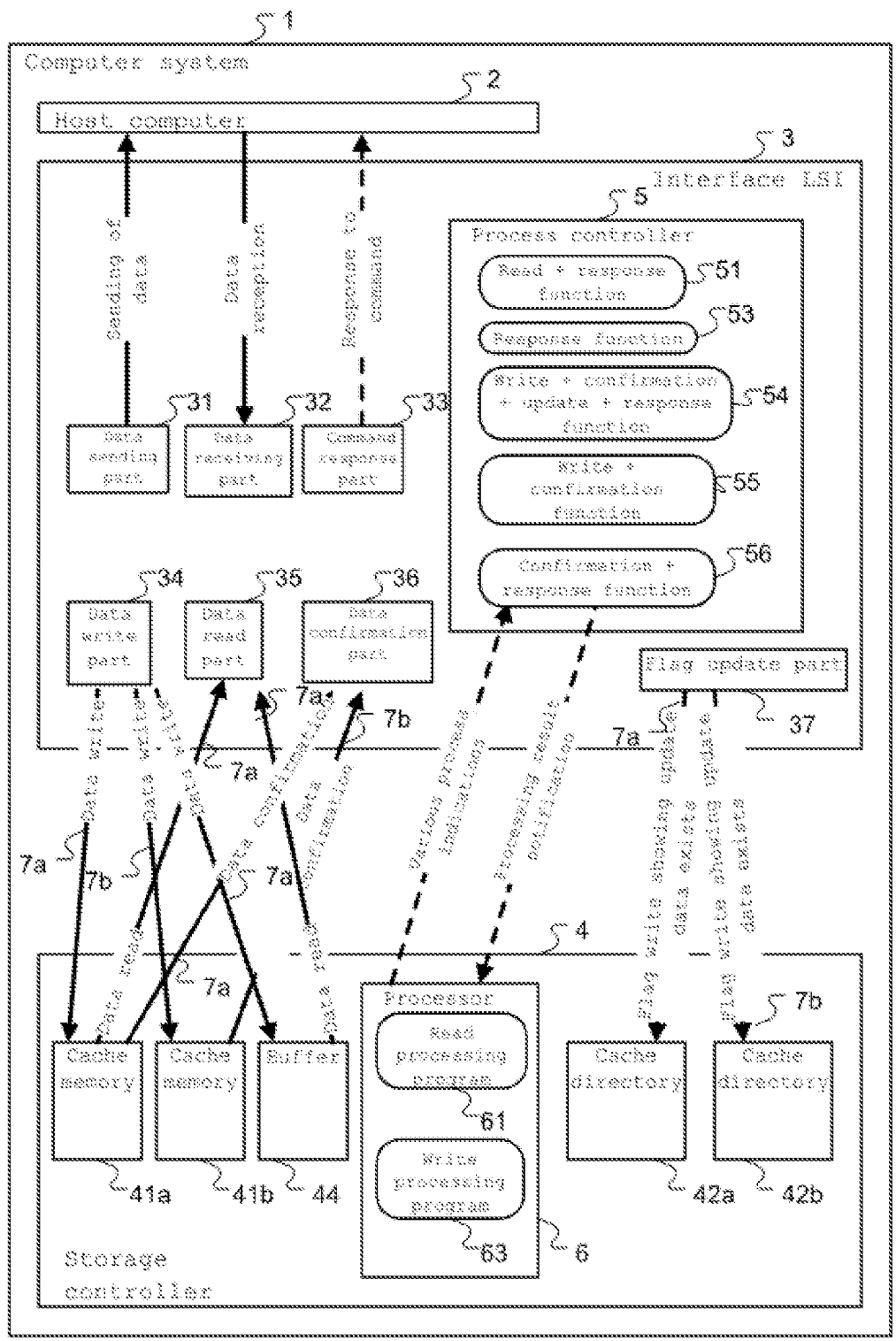
FIG. 1 is a drawing illustrating the configuration and an overview of a computer system 1 related to a first embodiment.

FIG. 1 is a drawing illustrating the configuration and an overview of a computer system 1 related to a first embodiment.

An overview of the computer system 1 related to this embodiment will be described by referring to FIG. 1.

The computer system 1 related to this embodiment includes either a host computer or a server (referred to hereinbelow as host) 2, a storage controller 4, and an interface device 3. The host 2 and the storage controller 4 are coupled to the interface device 3. The interface device 3, for example, may be a semiconductor interface device, and in this embodiment is an interface large-scale integration (LSI) (referred to hereinbelow simply as LSI). The LSI 3 can improve the performance of a read/write process performed between the host 2 and the storage controller 4.

Generally speaking, a storage controller is configured to receive a read/write request from a host, and a processor core of a processor in the storage controller is configured to perform a read/write process based on the read/write request. The read/write process is configured from a large number of steps, and, in addition, the sending and receiving of read/write data is also performed via the processor core, and the read/write data is stored in a cache memory, which is a temporary storage area. Thus, a read/write process places a heavy load on the processor. Generally speaking, in a read process, the processor core is configured to determine whether or not read-data from the host resides in the cache memory, and when the result of the determination is that the read-data resides in the cache memory, to send the read-data together with a read response to the host. Alternatively, when the read-data does not reside in the cache memory, the processor core is configured to read the read-data to the cache from a final storage device (auxiliary storage device) such as a hard disk drive (HDD) not shown in the drawing, and to send this read-data to the host together with the read response. In a write process, the processor core is configured to write write-data from the host to one cache memory, and, in addition, to determine whether or not this write-data is correct, to update a cache directory (cache memory management information), and to issue a write response to the host. After issuing the write response, the processor core is configured to copy the write-data to a different cache memory (data redundancy) and to update the cache directory. In addition, the processor core, as necessary, is configured to perform post-response backend processing (typically, processing for writing the write-data from the cache memory to a final storage device).

Accordingly, in this embodiment, when the storage controller 4 receives a read/write request from the host 2, a processor 6 is configured to issue an indication to a process controller 5 (described further below) of the LSI 3 to cause the LSI 3 to execute either a portion or all of the steps performed in the read-write process in place of the processor core. For example, the processor 6 can be configured to issue various indications to the LSI 3 in accordance with a state, such as the data being stored in the cache memory (hereinafter referred to as cache) 41. Meanwhile, the process controller 5, in accordance with an indication from the processor 6, is configured to perform either a portion or all of the other steps performed in the read/write process. The result of this is that the mediation of the processor core in the read/write process is reduced, thereby making it possible to improve the performance of the storage controller 4. In particular, since the sending and receiving of data, that is, the sending and receiving of read/write data does not involve the processor core, the load on the processor 6 can be lessened. In addition, performance can be improved even more for a write process, which has a larger number of steps than a read process. For example, in the case of an online transaction process or the like, in which, from the standpoint of reliability, the write data from the host 2 must be multiplexed and stored in a storage apparatus disposed outside the host 2, by improving the write performance with the LSI 3 as described hereinabove, it is possible to efficiently realize large-scale processing in accordance with exchanging larger amounts of data.

The configuration of the computer system 1 related to this embodiment will be described in detail below by referring to FIG. 1.

The computer system 1, as described hereinabove, has a host 2, a storage controller 4, and an LSI 3.

The host 2 is a computer that has a processor 21 (refer to FIG. 13) and a memory (not shown in the drawing), and is configured to send a read/write request to the storage controller 4 via the LSI 3.

The storage controller 4 may have one or more physical storage devices, and one or more physical storage devices may be coupled to the storage controller 4 externally. Furthermore, one or more logical volumes having a plurality of logical areas are formed on the basis of a plurality of physical storage areas of the one or more physical storage devices. A virtual logical volume to which either the logical volume or a storage area of the logical volume is allocated is provided to the host 2. The storage controller 4 has a plurality of caches 41, a plurality of cache directories (hereinafter referred to as directories) 42, and a processor 6.

The cache 41 is either a volatile or a nonvolatile memory for temporarily storing read/write data. Additional information, which is associated with the number of a logical volume (hereinafter referred to as volume number) having a logical area in which data is to be stored and which denotes information as to whether or not additional processing is required for the respective logical volumes, is stored in the cache 41. Specifically, the additional information, for example, is information as to whether or not a remote copy is required and information as to whether or not a snapshot is required for each logical volume, but is not limited thereto. Furthermore, an address showing a read-source volume number and a logical area (hereinafter, referred to as logical address) is included in a read request. A write-destination volume number, a logical address, and write data are included in a write request.

To maintain reliability, metadata may be attached to data for each prescribed range of the data (for example, each sector) when writing data to the cache 41. Specifically, for example, the metadata includes reference information (for example, a reference tag) including the logical address of a data storage destination, and a guard part for configuring a data error code (for example, a CRC value). In the following description, the address of a logical area in which data is stored will be described as a logical address, reference information including the logical address of the data storage destination will be described as a reference tag, and a data error code will be described as a CRC value, but the present invention is not limited thereto.

The directory 42 is information for managing the cache 41 (refer to FIG. 8). Specifically, for example, as shown in FIG. 8, a volume number 421 for the data and a logical address in the volume (Logical Block Address) 422, and a memory address 423 of a cache area in the cache 41 for the data are associatively managed in the directory 42 for data stored in the cache 41. Also, a dirty flag 424 denoting whether or not write-data is stored in the cache area specified by the memory address 423 is configured in the directory 42. The dirty flag 424, for example, is configured to "0" as the default, and is configured to "1" when write-data is stored in a corresponding cache memory 42 via a write process or the like.

Two or more caches 41 (two in this embodiment, 41*a* and 41*b*) are incorporated in the storage controller 4 so as to enable data to be stored and an operation to continue even when there has been a hardware or other such failure (that is, for multiplexing the data). This embodiment incorporates the same number of directories 42 (in the drawing, 42*a* and 42*b*) corresponding to the cache 41 so as to manage the information for each cache 41, but the present invention is not limited thereto. Hereinafter, when making a distinction, the two caches (two directories) will be referred to as caches 41*a* and 41*b* (directories 42*a* and 42*b*), and when not distinguishing therebetween, will be referred to as the cache 41 (the directory 42).

The processor 6 is configured to run programs for controlling the storage controller 4. These programs, for example, are a read processing program 61 for executing a read process on the basis of a read request from the host 2, and a write processing program 63 for executing a write process on the basis of a write request. The read process and the write process are for issuing to the LSI 3 indications corresponding to the status of data and so forth.

The LSI 3 has a data sending part 31, a data receiving part 32, a command response part 33, a data write part 34, a data read part 35, a data confirmation part 36, a flag update part 37, and a process controller 5. It is supposed that these parts are configured using a hardware configuration for performing the operations described in detail hereinbelow. The data sending part 31 is configured to send read data to the host 2. The data receiving part 32 is configured to receive a write request and write-data from the host 2. The command response part 33 is configured to issue a response to a read/write request from the host 2. The data write part 34 is configured to write write-data to the cache 41. The data read part 35 is configured to read read-data from the cache 41. The data confirmation part 36 is configured to confirm whether or not data is being stored in the cache 41. The flag update part 37 is configured to perform directory 42 update processing. The process controller 5 is configured to control the aforementioned parts 31 through 37 in accordance with an indication from the processor 6. The processing performed by each of the parts 31 through 37 will be described in detail later on.

The process controller 5 is configured to provide a plurality of functions, including a read+response function 51, a response function 53, a write+confirmation+update+response function 54, a write+confirmation function 55, and a confirmation+response function 56, realized in accordance with indications from the processor 6. The read+response function 51 is for sending data and notifying the host 2 that processing has been completed in response to an indication based on a read request from the processor 6. The response function 53 is for notifying the host 2 that a process has been completed in response to an indication based on a write request from the processor 6. The write+confirmation+update+response function 54 is for executing a process for writing write-data to the cache 41, a confirmation process, and a directory 42 update process, and notifying the host 2 that the processing has been completed in response to indications based on a write request from the processor 6. In this embodiment, the process for writing write-data to the cache 41 at this point performs writes to two locations, cache 41*a* and cache 41*b*. The same holds true for the confirmation and update processes, and in the confirmation process, processing is performed in the two locations 41*a* and 41*b*, and in the update process, processing is performed in the two locations 42*a* and 42*b*. This configuration makes it possible to store data even when a failure has occurred in any of the hardware, and to improve the reliability of the system. The write+confirmation function 55 is for performing a process for writing to the cache 41 and for performing a confirmation process in response to an indication based on a write request from the processor 6. The confirmation+response function 56 is for performing a confirmation process for data for which a write process has been performed to the cache 41, and for notifying the host 2 that processing has been completed in response to indications based on a write request from the processor 6. Here, too, a response is issued to the host computer after confirming that data has been correctly stored in two locations in the cache memory 41, and as such, the confirmation process is performed for both of the cache memories 41*a* and 41*b*. The respective processes will be described in detail later on. These processes may be performed by a processor (not shown in the drawings) executing a program stored in the LSI 3 memory (not shown in the drawing). These processes may also be realized using hardware circuits. Therefore, the processor is not an essential element of the LSI 3.

Processes executed by the storage controller 4 and the LSI 3 in response to a read request from the host 2 will be described in order hereinbelow.

Figure 2:
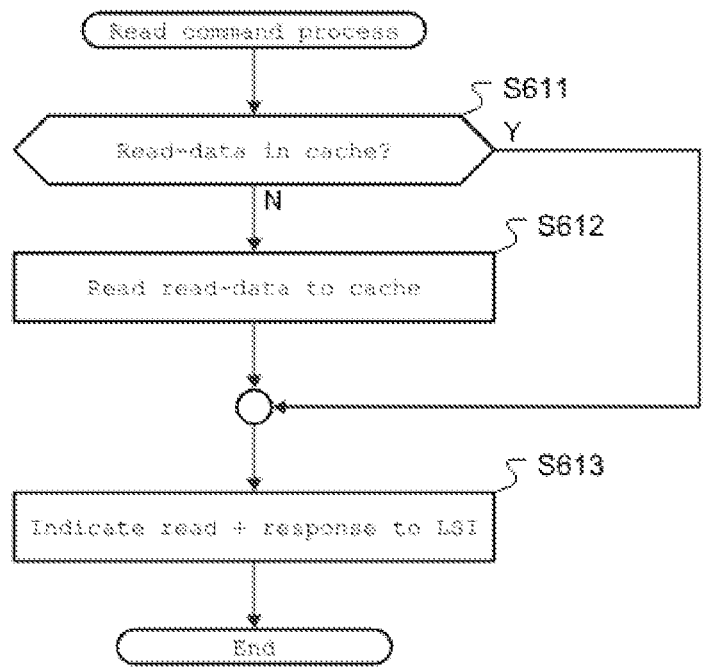
FIG. 2 is a flowchart of a read command processing program 61.

FIG. 2 is a flowchart of a read command processing program 61. This program is executed by the processor 6 (specifically, the processor core inside the processor 6, the description for which is the same hereinafter) when the storage controller 4 has received a read request from the host 2 via the LSI 13. The LSI 13 is configured to only transfer the request at this time point.

The processor 6 is configured to search the directory 42 and to determine whether the read-data requested by the host 2 resides in the cache 41 (S611). In this embodiment, the premise is that the same data is stored in the caches 41*a* and *b*. Accordingly, in S611, the processor 6 may be configured to search at least one of the directories, or to search both of the directories. Specifically, the processor 6 is configured to reference the directory 42 and to determine whether or not the memory address of the cache 41 corresponding to the read-source logical address included in the read request resides in the cache directory management information. When the read-data does not reside in either of the caches 41a or b (S611: No), the processor 6 is configured to read the read-data to the cache 41 from the physical storage device storing the data (S612), and to advance the processing to S613. Alternatively, when the read-data resides in at least one of the caches 41a or b (S611: Yes), the processor 6 is configured to advance to S613. In S613, the processor 6 is configured to instruct the LSI 3 process controller 5 to perform read+response, and to end the processing.

Figure 3:
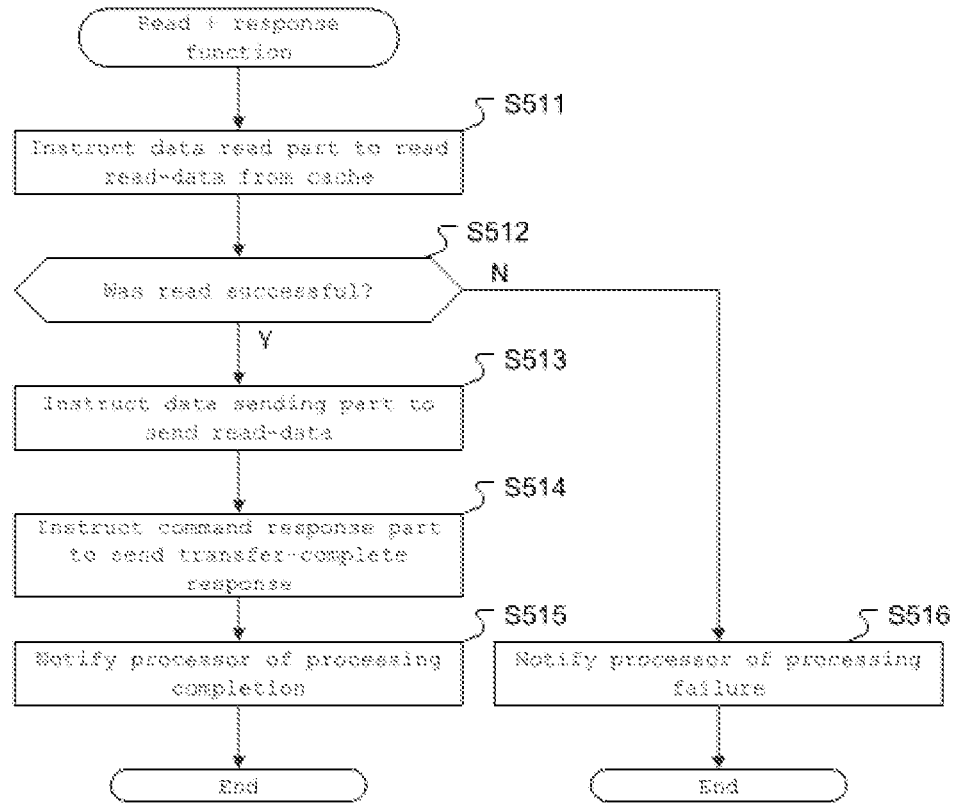
FIG. 3 is a flowchart of processing for a read+response function 51.

FIG. 3 is a flowchart of the processing of the read+response function 51. This processing is started in accordance with an indication from the processor 6 when the storage controller 4 has received a read request from the host 2.

In accordance with this process being started, the process controller 5 is configured to instruct the data read part 35 to read the read-data from the cache 41 (S511). In this embodiment, a read request is issued at the least to the cache 41a, b that has data. When data resides in both of the caches 41a and 41b, the determination as to which cache to read from is made by taking into account the load, such as the amount of accesses to the memory. The process controller 5 is configured to determine whether or not the read was successful (S512). Specifically, for example, the process controller 5 first determines whether the read-data was read out, that is, whether an error response or a timeout occurred with respect to the read. Then, when the read-data has been read out, the process controller 5, for example, references the metadata attached to the read-data, compares whether the reference tag matches an expected value, and whether a CRC value configured in a guard part matches the CRC value calculated from the read-data, and determines whether or not the read-data is correct. The expected value in this case may be the logical address included in the read request. When the read-data read was successful (S512: Yes), the process controller 5 is configured to instruct the data sending part 31 to send the data that was read (S513), and to instruct the command response part 33 to send to the host 2 a completion-response with respect to the read request (S514). Then, the process controller 5 is configured to notify the processor 6 of the fact that the sending of the read-data to the host 2 and the completion-response have ended (S515), and to end the processing. Alternatively, when the read-data read has failed (S512: No), the process controller 5 is configured to notify the processor 6 of the processing failure (S516) and to end the processing. The process controller 5 can also be configured to notify the processor 6 of the cause of the aforementioned processing failure together with the notification of S516. The cause of the failure here, for example, may be a timeout denoting that a response was not received with respect to the read request within a fixed time period, a read failure in which a data read was not possible due to a memory failure or the like, or the DIF field differed from the expected value.

Generally speaking, in most cases the processing ends normally. But at the same time, the causes of a processing failure are varied, and most often failure factors analysis and extremely complicated processing is needed for determining subsequent action. However, there is a low probability of the processing ending in failure. Thus, a software process that is able to easily describe complicated processes is best when processing fails, and in this embodiment, it is preferable that this processing be implemented by the processor 6. Alternatively, normal processing is shared with the LSI 3 that features a hardware-based configuration capable of rapidly processing normal processes. This configuration makes possible the simultaneous pursuit of both performance under normal circumstances and advanced processing under abnormal circumstances. The same holds true for the following example. As an exemplification of the processing performed by the processor 6 after a cause-of-failure notification, processing is executed once again in accordance with the results obtained by investigating the cause of the failure, and when successful, a notification of normal completion is sent to the host 2. When it has been determined that success is not possible, the processor 6 may notify the host 2 of a processing failure.

According to the above, in a read process, the sending of the read-data to the host 2 and the completion-response with respect to the read request can be realized via a single indication to the LSI 3, and the processing can be shared with the LSI 3. The load on the processor 6 can be lessened since the number of steps in the processing to be executed is reduced. As a result, the load on the processor 6 is lessened by reducing the involvement of the processor 6 in the read process, thereby improving the performance of the storage apparatus. Also, with respect to the host 2, since the time from the read request until the completion-response is decreased, the processing capabilities of the host 2 are also improved. In addition, the processor 6 executes the complicated processing that occurs infrequently, and the LSI 3 performs the frequent, relatively easy processing, thereby clarifying processing sharing, and improving the processing capabilities of the entire computer system 1 as a result.

The processes executed by the processor 6 in the storage controller 4 and the LSI 3 with respect to a write request from the host 2 will be described in order below.

Figure 4:
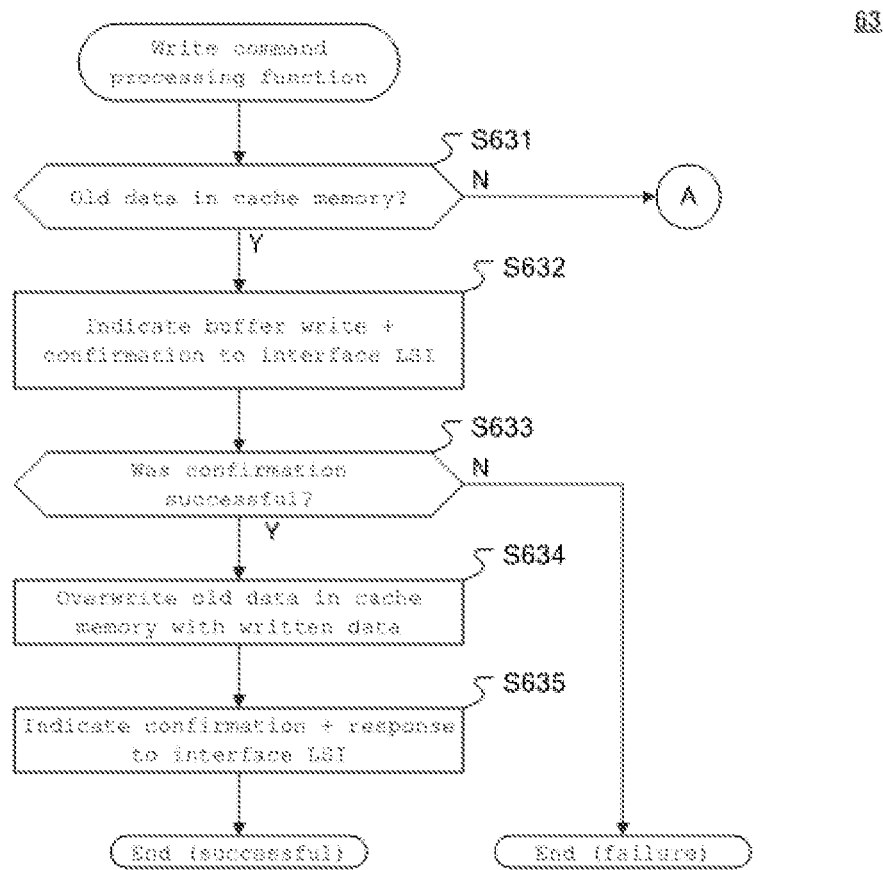
FIG. 4 is a partial flowchart of a write command processing program 63.

FIG. 4 is a partial flowchart of the write processing program 63. This program is executed by the processor 6 (specifically, the processor core inside the processor 6, the description for which is the same hereinafter) when the storage controller 4 has received a write request and write-data from the host 2.

When this processing is started, the processor 6 is configured to search the directories 42a, b and to determine whether or not old data (data corresponding to the write-data and to be updated by the write-data) is stored in the cache 41 (S631). For example, this determination is to determine whether or not the write-destination logical address included in the write request resides in the directory 42. When old data corresponding to the write-data is stored in the cache 41, a data update (overwrite) is performed in the cache 41. In a case where the old data is overwritten when the write-data is sent, there is a possibility of the old data being discarded as a result of the overwrite process being suspended part way through for some reason or another (such as a host-side error). Thus, it is also possible to provide, as a temporary storage area, a buffer that differs from the cache inside the storage controller 4 (44a, b of FIG. 14). When old data updating is performed using the write-data in the cache 41, as shown hereinbelow, the write-data received from the host 2 is temporarily stored in the buffer 44, and thereafter, the write-data may be used to overwrite the cache 42 in which the old data is stored.

When the result of the determination in S631 is that old data is stored in the cache 41 (S631: Yes), the processor 6 is configured to reserve either of the buffers 44a and 44b for temporarily storing the data. Thereafter, the processor 6 is configured to notify the process controller 5 of the address in the reserved buffer 43a, b, and to indicate to the process controller 5 a write+confirmation process that uses this area as the transfer destination (S632). When the process controller 5 is able to confirm that the write-data was correctly written in the write+confirmation process for writing the write-data to the area of the buffer 44, "processing complete" is notified by the process controller 5, and when confirmation is not possible, "processing failure" is notified. Alternatively, when the result of the determination is that old data does not reside in at least one of the caches 41a, b (S631: No), the processor 6 is configured to advance the processing to S636 (Refer to FIG. 5).

The processor 6 is configured to determine whether or not it was possible to confirm that the write-data write was performed normally to both buffers 44a, b (refer to FIG. 13) (S633). When confirmation is possible (S633: Yes), the processor 6 is configured to overwrite the old data in the cache 41 with the buffer 44 write-data written in S632 (S634). At this time, the processor 6 is configured to multiplex the write-data. For example, when the old data is stored in the two caches 41a and 41b, the processor 6 is configured to overwrite the old data in both caches 41a and 41b with the write-data.

Thereafter, the processor 6 is configured to indicate a confirmation+response process to the process controller 5 (S635) and to end the processing. The confirmation+response process will be described in detail later on, but in this process, when it is possible to confirm that the write-data has been written correctly, "processing complete" is notified by the process controller 5, and when confirmation is not possible, "processing failure" is notified (refer to FIG. 9). Since data is duplexed in the caches 41a and 41b at this point, the confirmation process is configured to perform confirmation for all the caches (for example, 41a and 41b) in which the data is stored. A post-overwrite confirmation may be performed by the processor 6 in S634. In accordance with this, in S635, the processor 6, for example, may simply issue a response indication the same as in S640.

In S633, when it in not possible to confirm that the write-data write was performed correctly (S633: No), the processor 6 is configured to end the processing. After the processing ends, the processor 6 is configured to analyze the cause of the write-data write not ending normally. The processor 6 is configured to then perform an appropriate process, such as, for example, requesting that the host 2 resend the write-data.

At this point, the write-data overwrite of S634 may be performed by the interface LSI 3. In accordance with this, after S633, the processor 6 is configured to issue a dual-writing indication to the interface LSI 3. The indication-receiving interface LSI 3 is configured to read the data in the buffer 44, and to write this data to two locations, caches 41a and 41b. In addition, the interface LSI 3 may be configured to perform a series of operations in accordance with this, including those up to the confirmation+response of S635.

Or, the buffer 44, for example, may be a memory in the host computer 2. In accordance with this, the interface LSI 3, upon receiving the indication of S632, is configured to write the data received from the host computer 2 to a buffer area in the host computer 2. Or, when the data is already being stored in memory, the interface LSI 3 is configured to notify the processor 6 side that the write has been completed without storing the data once again. Thereafter, in S634, the interface LSI 3 is configured to read the data written in the buffer area on the host computer 2, and to write this data to two locations, caches 41a and 41b. In accordance with this, it is possible to reduce the number of data transfers on the storage side by 1, thereby making it possible to reduce the processing of the processor and the interface LSI 3 required for transferring data. Performance can thus be further improved.

According to this configuration, to include the aforementioned cases, by having the interface LSI 3 perform data duplexing, the load on the processor 6 can be reduced and performance can be improved.

Figure 5:
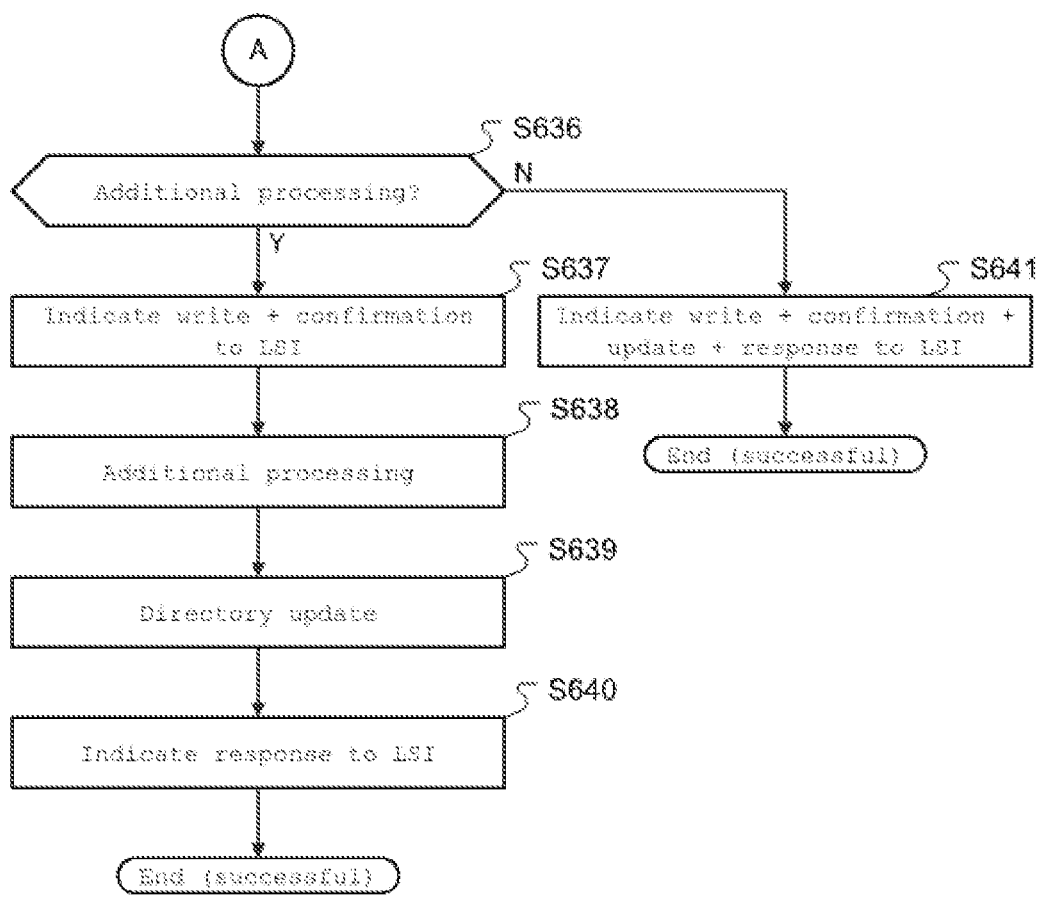
FIG. 5 is the remainder of the flowchart of the write command processing program 63.

FIG. 5 is the remainder of the flowchart of the write command processing program 63. The following steps are performed by the processor 6 (specifically, the processor core inside the processor 6, the description for which is the same hereinafter) when old data does not reside in the cache 41 (S631 in FIG. 4: No).

The processor 6 is configured to determine whether or not there is additional processing after the write-data has been stored in the cache 41 by executing the write command processing program 63 (S636). Specifically, the processor 6 is configured to reference the additional information stored in the cache 41, and to determine whether to not additional processing is required for the write-destination volume number included in the write request.

When the result of the determination is that additional processing is required (S636: Yes), the processor 6 is configured to notify the LSI 3 of the buffer area 44 or the addresses in the cache memories 41a, b, to indicate a write+confirmation process (S637), and thereafter, to perform the additional processing (S638). The additional processing, as described hereinabove, for example, is remote copy processing and snapshot processing. When performing a remote copy process, the processor 6, for example, is configured to send write-data and a copy request including a copy-destination volume number and a logical address to a remotely coupled storage system, and to complete the processing by receiving a response from the copy destination. In the case of a snapshot process, when data resides in a logical area (referred to as target area in this description) showing the logical address of the write-destination logical volume included in the write request, the processor 6, for example, is configured to complete the processing by saving the target-area data to a different area in a different volume (for example, a pool) so as to extract a volume image of the time point thereof. Thereafter, the processor 6 is configured to update the directory 42 (S639). This processing is the same as that of S545, which will be described further below. Thereafter, the processor 6 is configured to indicate a response to the LSI 3 (S640) and to end the processing. Generally speaking, an additional process is a storage function and is often extremely complicated, and may take longer to process than a normal process. Accordingly, by using hardware for the processing before and after the additional processing, and enabling the additional processing to be performed using software, both the functional expandability and performance of the storage system can be made consistent with one another.

Alternatively, when the result of the determination in S636 is that additional processing is not required (S636: No), the processor 6 is configured to notify the LSI 3 of the addresses in the cache memories 41a, b, to indicate a write+confirmation+update+response to the LSI 3 (S641), and to end the processing.

According to the above, it is possible to reduce the number of processing steps performed by the processor 6 and to lessen the load on the processor 6 in a variety of situations without losing the reliability and functionality required in the storage apparatus. This makes it possible to improve storage apparatus performance and the processing capabilities of the host 2, thereby enabling the processing capabilities of the computer system 1 to be improved as a result. Also, for example, the processor 6 executes the complicated processes, such as additional processes and overwriting, which occur infrequently, and frequent, relatively easy processes, such as a cache 41 write process, a confirmation process, a response process, and an update process, are performed by the LSI 3, thereby clarifying processing sharing, and improving the processing capabilities of the entire computer system 1 as a result.

Figure 6:
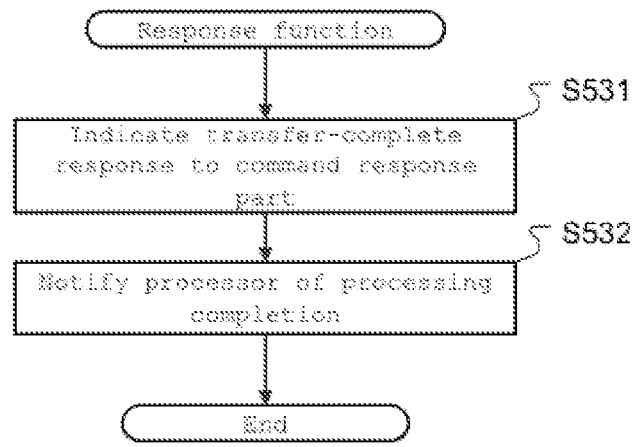
FIG. 6 is a flowchart of processing for a response function 53.

FIG. 6 is a flowchart of the processing for response function 53.

This processing starts in accordance with a response indication from the processor 6 (refer to S640 of FIG. 5). The processes will be described in order hereinbelow.

In accordance with this process being started, the process controller 5 is configured to instruct the command response part 33 to send a transfer-complete response to the host 2 (S531). The process controller 5 is configured to notify the processor 6 of the fact that the response was performed (S532), and to end the processing.

This processing is not limited to a case in which there is a response indication in S640 of FIG. 5, and may be performed when a process other than a response, such as a write-data write process to the cache 41, a confirmation process, and so forth, has already be performed using one method or another.

Figure 7:
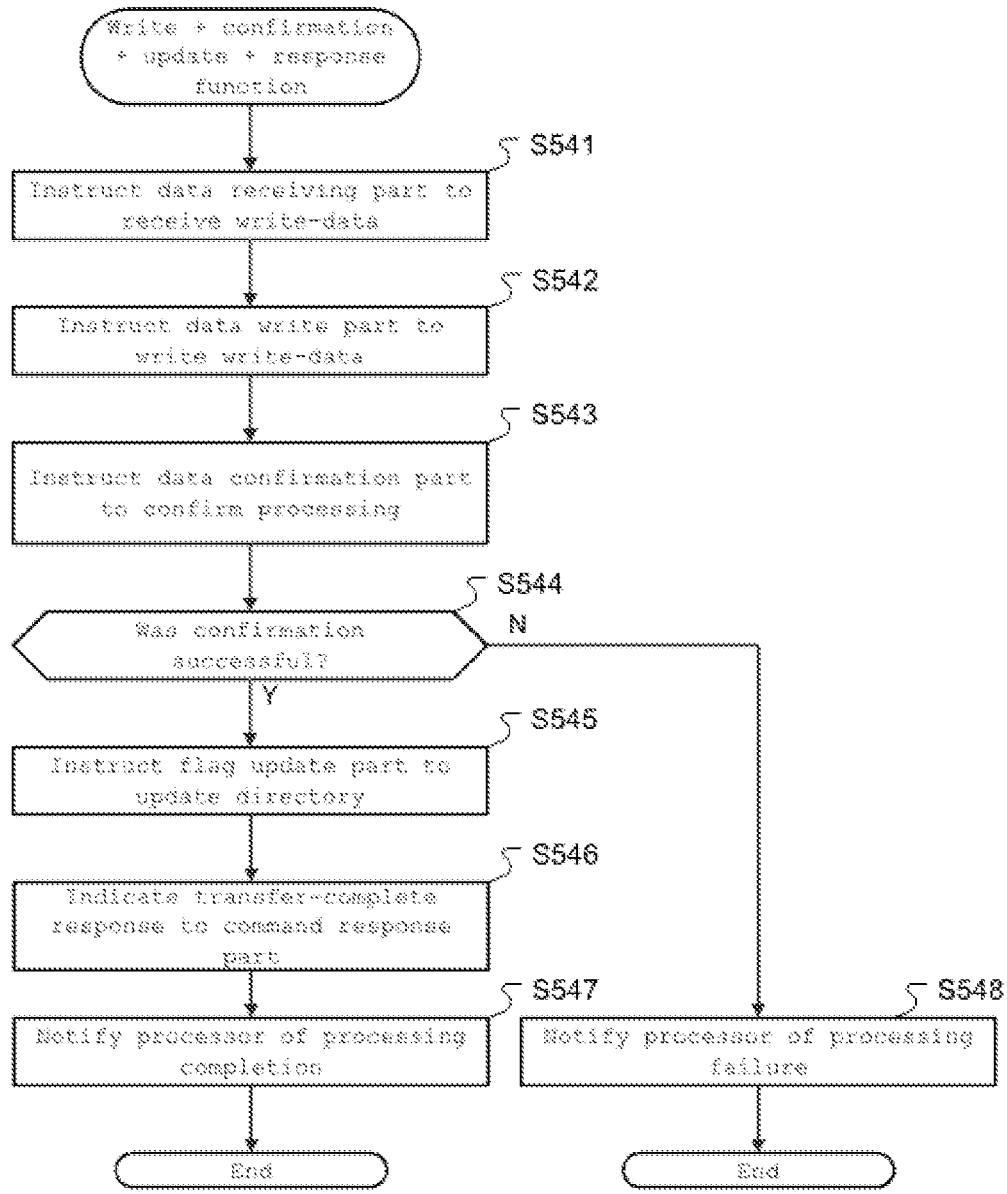
FIG. 7 is a flowchart of processing for a write+confirmation+update+response function 54.

FIG. 7 is a flowchart of the processing for the write+confirmation+update+response function 54.

This processing is started in accordance with a write+confirmation+update+response indication from the processor 6 (refer to S641 of FIG. 5). Data received from the host computer at this point must continue to be stored even when a hardware failure or the like has occurred. Thus, a write and a confirmation process are performed for both the caches 41*a* and 41*b*. An update process is also performed for both of the cache directories 42*a* and 42*b*.

In accordance with this process being started, the process controller 5 is configured to instruct the data receiving part 32 to receive the write-data from the host 2 (S541). The process controller 5 is configured to instruct the data writing part 34 to write the received data to the caches 41*a*, *b* (S542). At this time, the process controller 5 is configured to use the write-destination address for the write-data specified beforehand in the processing indication from the processor 6. Based on this indication, the data writing part 34 is configured to write the write-data to the two caches 41*a* and 41*b*. The data writing part 34 may also be configured to calculate a logical address and a CRC value based on the write-data, and to assign this information to the write-data as metadata (a reference tag and a guard value).

The process controller 5 is configured to indicate to the data confirmation part 36 a confirmation process for confirming whether or not the data has been written to the cache 41 correctly (S543). This processing is also performed with respect to both the cache 41*a* and the cache 41*b* to which the write was performed. The confirmation process will be described in detail further below. The confirmation process confirms that the data has been written to the caches 41*a*, *b* correctly (S544). When the result is Yes, the process controller 5 is configured to reflect in the directory 42 the fact that the data has been stored by instructing the flag update part 37 to write a flag showing that the data has been stored in the cache 41 area of a memory address corresponding to the logical address denoting the logical area specified by the write request (S545). This processing is also performed for the two directories 42*a* and 42*b*. The process controller 5 is configured to instruct the command response part 33 to send a transfer-complete response to the host 2 (S546), to notify the processor 6 that the response has been performed (S547), and to end the processing.

Alternatively, in S544, when it is not possible to confirm that the data has been correctly stored in at least one of the caches 41*a*, *b* (S544: No), the process controller 5 is configured to notify the processor 6 that confirmation processing has failed (S548), and to end the processing. In S548, neither the re-execution of this processing nor an error response to the host 2 is performed. In accordance with this, the processor 6 is configured to investigate the cause of the confirmation processing failure, and to determine whether this process should be re-executed or an error response should be sent to the host 2. The processor 6 may be configured to instruct the process controller 5 to issue a notification that the confirmation process was either a success or a failure in accordance with this determination.

According to the above, the four steps, that is, the process for writing data to the cache 41, the confirmation process, the directory 42 update process, and the response process, are performed in accordance with a single indication to the process controller 5 from the processor 6. Therefore, it is possible to reduce the load on the processor 6, thereby improving storage controller performance and host 2 processing capabilities, and in turn improving the processing capabilities of the entire computer system 1.

A flowchart of the processing for the write+confirmation function 55 will be described next.

This process is started in accordance with a write+confirmation indication from the processor 6 (refer to either S632 of FIG. 4 or S637 of FIG. 5).

This process is performed using the same processing as that for a portion of the steps in the write+confirmation+update+response function 54. Specifically, it is assumed that, with the exception of S545 and 546, the processing of S541 through 544, S547, and S548 is performed.

Figure 9:
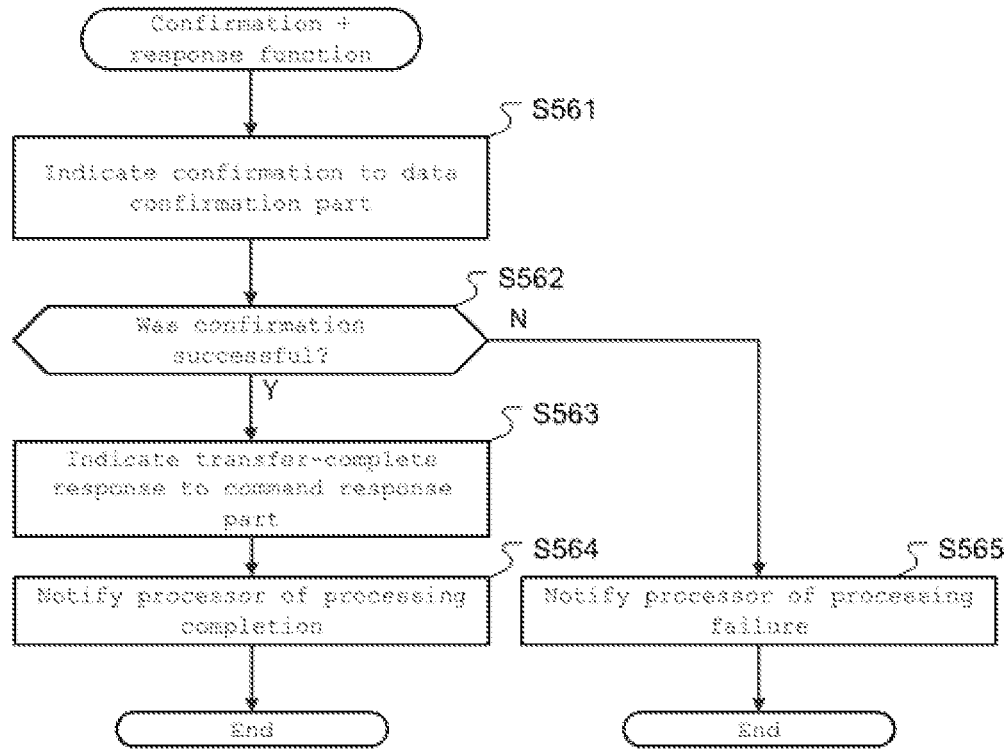
FIG. 9 is a flowchart of processing for a confirmation+response function 56.

FIG. 9 is a flowchart of the processing for the confirmation+response function 56.

This processing is started in accordance with a confirmation+response indication from the processor 6 (refer to 635 of FIG. 4).

In accordance with this processing being started, the process controller 5 is configured to indicate to the data confirmation part 36 a confirmation process for confirming whether or not data has been stored correctly in the cache 41 (S561). The data must be written to both caches 41*a* and 41*b* at this point in order for the storage system to respond that the write has been completed. Thus, the confirmation processing is performed for both the caches 41*a* and 41*b*. The confirmation process will be described in detail further below. When it is possible, in accordance with the confirmation process, to confirm notifications from both the caches 41*a*, *b* to the effect that the data has been correctly stored (S562: Yes), the process controller 5 is configured to instruct the command response part 33 to send a transfer-complete response to the host 2 (S563), to notify the processor 6 that a response has been performed (S564), and to end the processing.

Alternatively, when it is not possible to confirm in S562 that the data has been correctly stored in at least one of the caches 41*a*, *b* (S562: No), the process controller 5 is configured to notify the processor 6 that confirmation processing has failed (S565), and to end the processing.

As described hereinabove, this processing is invoked, for example, when temporarily storing the write-data in a free area in order to overwrite old data in the cache 41 with the write-data from the host 2 (S635 of FIG. 4). Thus, there is no need to update the directory 42, response processing should be performed immediately after confirmation processing, and the processing should be ended.

The confirmation process will be described below by giving a number of examples. The confirmation process, for example, is performed on the basis of an indication from the process controller 5 (specifically, for example, the indications of S553 of FIG. 8, S561 of FIG. 9, and so forth).

Figure 10:
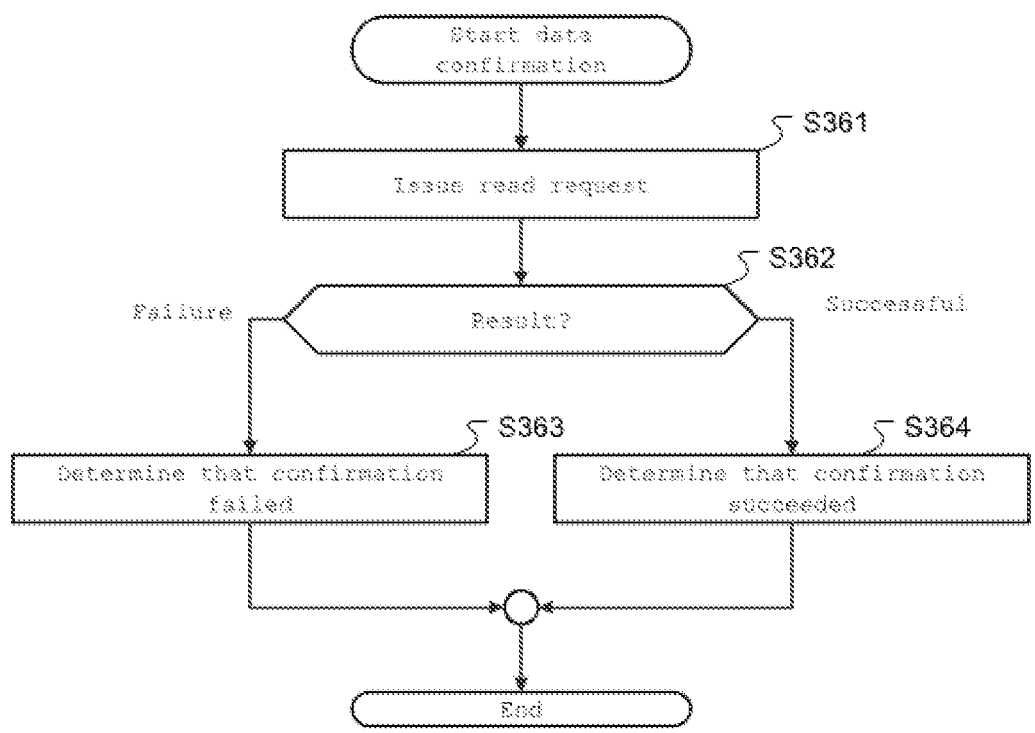
FIG. 10 is a flowchart showing an example (first example) of a data confirmation process by a data confirmation part 36.

FIG. 10 is a flowchart showing an example (first example) of processing for confirming data for one cache memory using the data confirmation part 36.

In accordance with this process being started, the data confirmation part 36 is configured to issue a read command to the storage controller 4 (S361). Specifically, for example, the read command is issued by specifying the address (for example, the write-destination logical volume and logical address based on a write request from the host 2 issued immediately before this process) of the data to be confirmed.

The data confirmation part 35 is configured to receive a response from the processor 6 with respect to the read command, and to determine the result of this response (S362). When the result of this determination is that an error response has been received, or that there was no response (S362: failed), the data confirmation part 36 is configured to determine that confirmation processing has failed (S363) and to end the processing. This determination, for example, is based on the supposition that the data transfer path to the address specified in the read command did not operate correctly, and as such, the write process for the target data was not completed and the target data is not stored in the cache 41. Alternatively, when the response to the read command has been reflected in S362 (S362: succeeded), the data confirmation part 36 is configured to determine that confirmation processing has succeeded (S364) and to end the processing. This determination, for example, determines that the data transfer path to the address specified in the read command operated correctly, and as such, the write process for the target data was completed normally and the target data is correctly stored in the cache 41.

According to the above, a determination can be made as to whether or not target data resides in the cache 41 using only the extremely simple process of issuing a read command to the target address to be confirmed. As a result, the confirmation process is able to confirm the existence of the data with little throughput.

Figure 11:
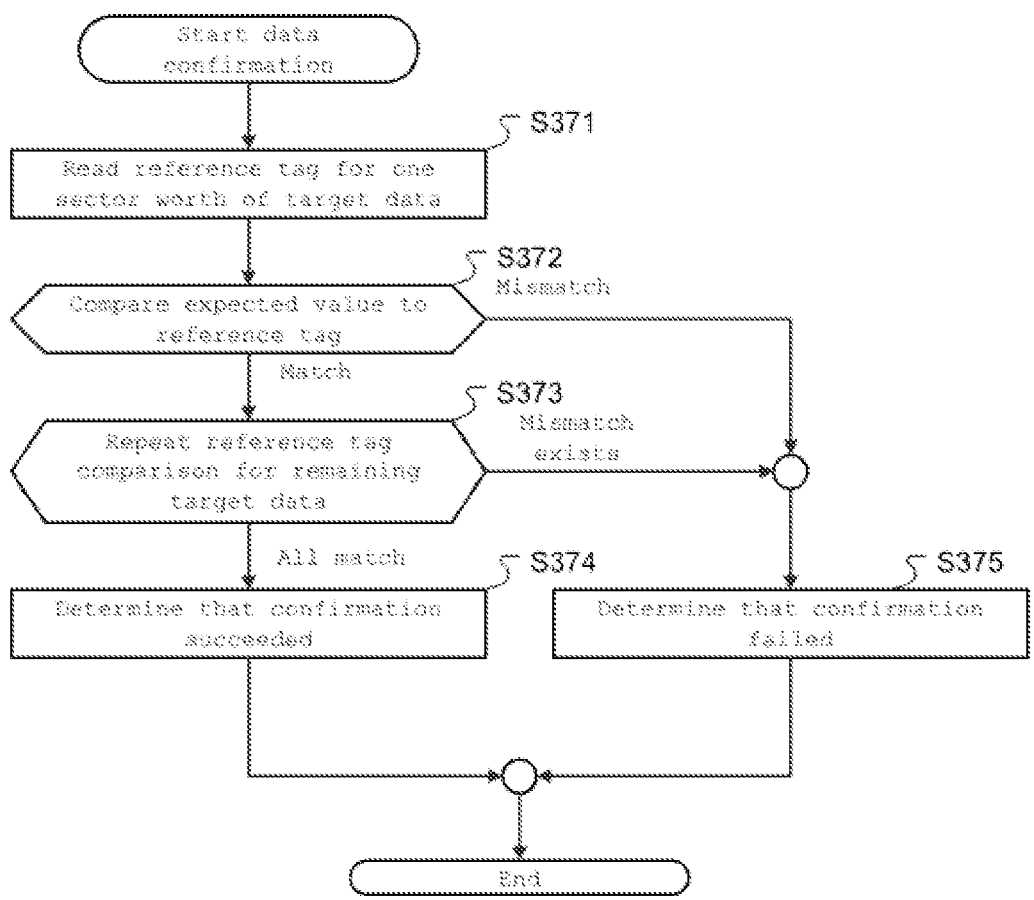
FIG. 11 is a flowchart showing a variation (second example) of the data confirmation process by the data confirmation part 36.

FIG. 11 is a flowchart showing a variation (second example) of the data confirmation processing by the data confirmation part 36. In this embodiment, the content of the data is confirmed.

In accordance with this process being started, the data confirmation part 36 is configured to read from the cache 41 the metadata reference tag attached to one sector's worth of data targeted for confirmation (hereinafter referred to as target data) (S371). Specifically, the data confirmation part 36 may issue a read command specifying the logical address of the target data to the storage controller 4, or may read the reference tag of the target data using another well-known method. The data confirmation part 36 is configured to compare the reference tag that is attached to the read one sector's worth of data to an expected value (S372). The expected value in this case may be the logical address specified in the read command when the target data was written. The logical address of the target data storage location may also be configured beforehand as the expected value. The expected value may also be sent from the processor 6 by way of the process controller 5. When these values match (S372: match), the data confirmation part 36 is configured to advance the processing to S373. Alternatively, when these values do not match (S372: mismatch), the data confirmation part 26 is configured to determine that confirmation failed (S375) and to end the processing.

In S373, the data confirmation part 36 is configured to repeat the processing of S371 and S372 for each sector for all remaining reference tags attached to the target data (S373). When the reference tags and expected values of all sectors of the target data match (S373: match), the data confirmation part 36 is configured to determine that confirmation succeeded (S374). Alternatively, when the reference tag and expected value in any of the sectors do not match (S373: mismatch), the data confirmation part 36 is configured to determine that confirmation failed (S375) and to end the processing.

According to the above description, it is possible to detect mistaken target data (that is, an error with respect to the data storage location). Also, since only a portion of the target data, more specifically, only the reference tag (metadata) is read in S371 and S373, it is possible to reduce the amount of data that is read. Furthermore, it is also possible to reduce the processing load since a CRC operation is not performed.

Figure 12:
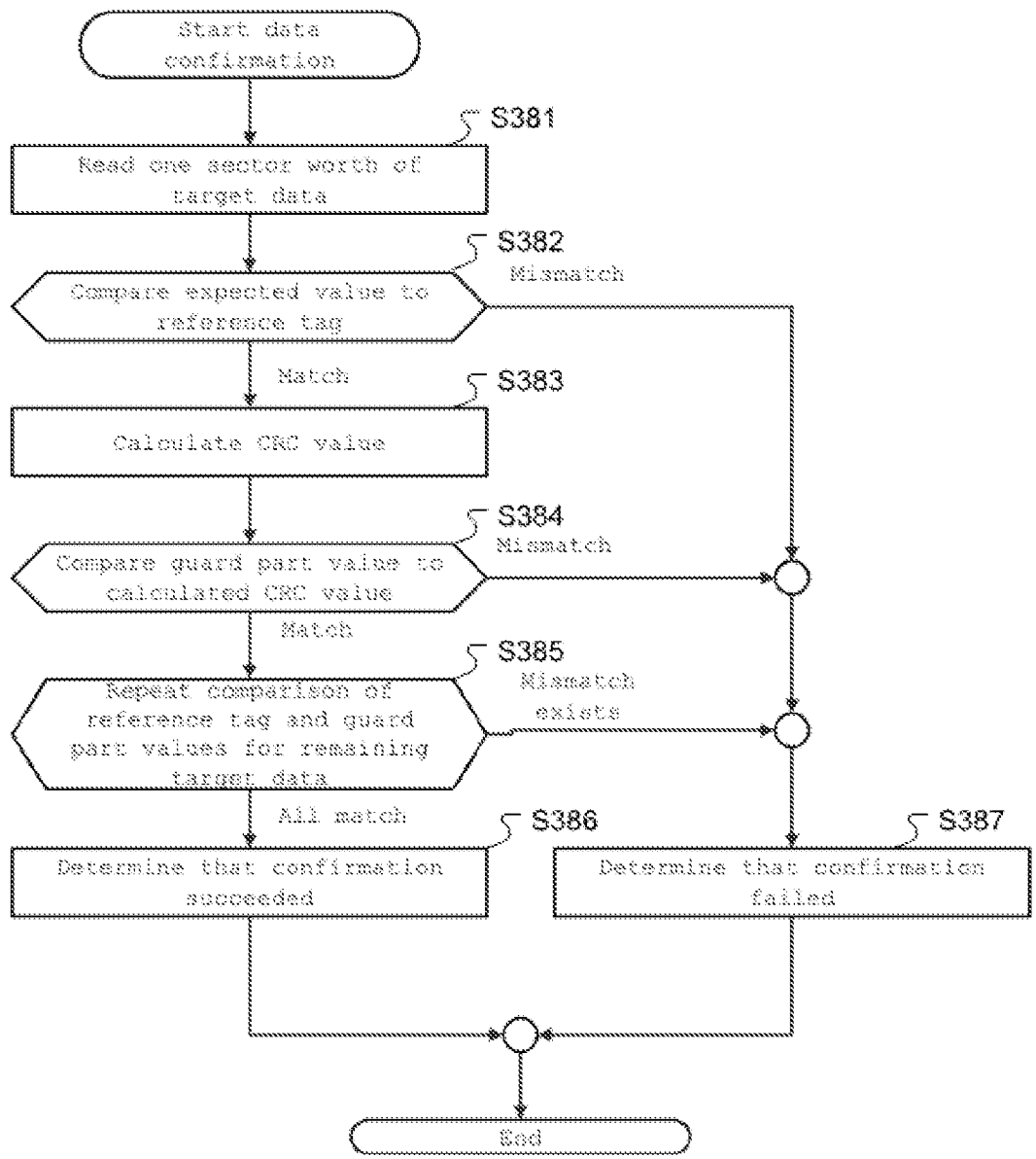
FIG. 12 is a flowchart showing a variation (third example) of the data confirmation process by the data confirmation part 36.

FIG. 12 is a flowchart showing a variation (third example) of the data confirmation processing by the data confirmation part 36.

In accordance with this process being started, the data confirmation part 36 is configured to read one sector's worth of the target data (data part and metadata) (S381). Specifically, the data confirmation part 36 may issue a read command specifying the logical address of the target data to the storage controller 4, or may read the reference tag of the target data using another well-known method. The data confirmation part 36 is configured to compare the reference tag of the sector that has been read to an expected value (S382). The details of this step are the same as those of S372. When these values match (S382: match), the data confirmation part 36 is configured to advance the processing to S383. Alternatively, when these values do not match (S382: mismatch), the data confirmation part 26 is configured to determine that confirmation failed (S387) and to end the processing.

Next, the data confirmation part 36 is configured to calculate a CRC value for the data part of the sector that was read (S383). The data confirmation part 36 is configured to compare the calculated CRC value to the CRC value of the guard part of the read sector (S384). When the result of this comparison is that these values do not match (S384: mismatch), the data confirmation part 36 is configured to determine that confirmation failed (S387) and to end the processing. Alternatively, when the result of the comparison is that these values match (S384: match), the data confirmation part 36 is configured to advance the processing to S385.

In S385, the data confirmation part 36 is configured to repeat the processing of S381 through 384 for each sector for all the sectors of the remaining target data (S375). When the respective reference tags and expected values, and CRC values and guard part CRC values match for all the sectors of the target data (S385: match), the data confirmation part 36 is configured to determine that confirmation succeeded (S386) and to end the processing. Alternatively, when the reference tag and expected value, and a CRC value and a guard part CRC value in any sector do not match (S385: mismatch), the data confirmation part 36 is configured to determine that confirmation failed (S387) and to end the processing.

In this process, it is possible to detect a mistaken target data and the occurrence of a target data error.

The fact that target data is stored in the cache 41, or the accuracy of the target data can be guaranteed using any of the aforementioned data confirmation processes. This makes it possible to improve the performance of the computer system 1 while maintaining the reliability of the storage apparatus. Furthermore, the confirmation process may be executed using any of the aforementioned examples, or may be executed using a combination of a plurality of the examples.

Embodiment 2

Figure 13:
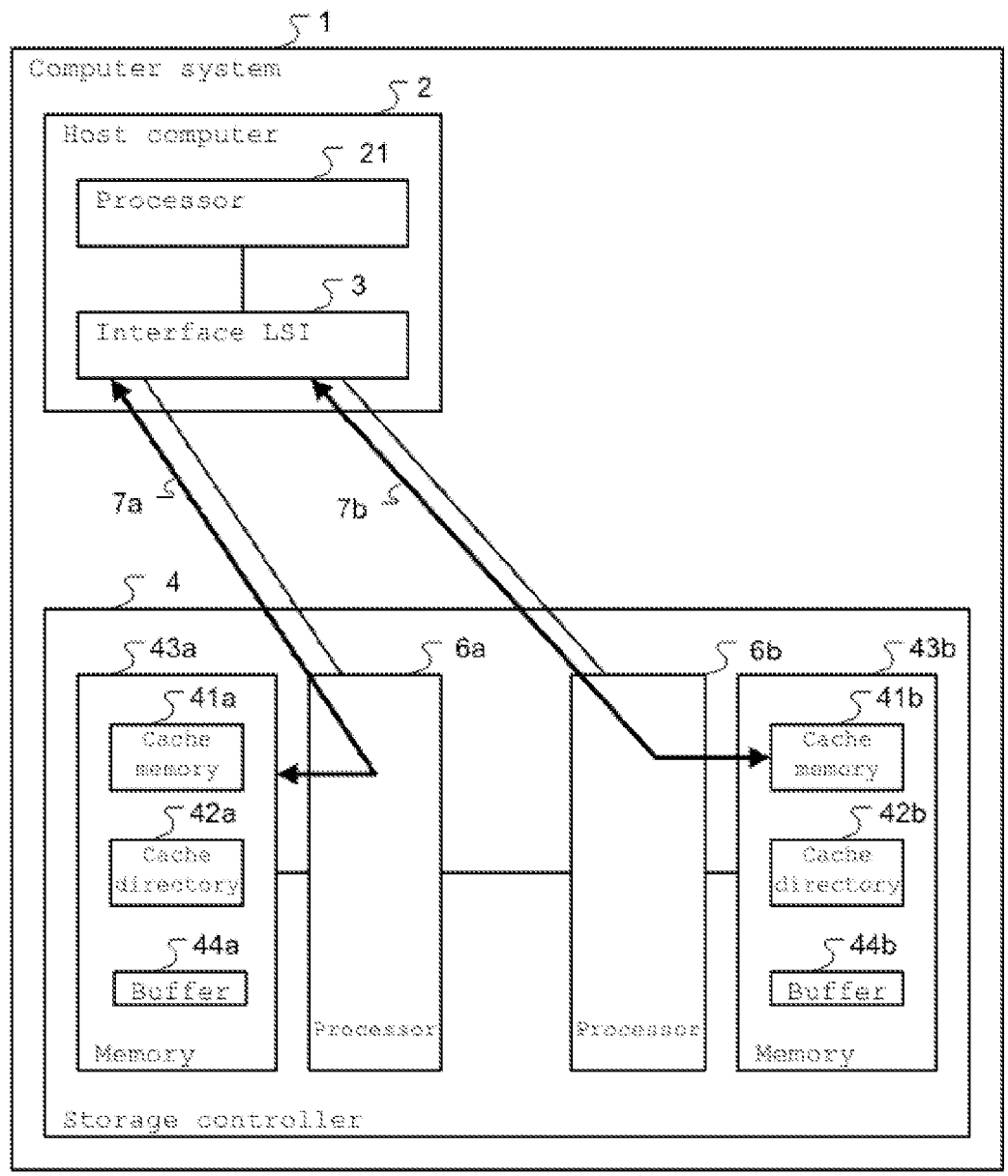
FIG. 13 is a drawing showing the hardware configuration of the computer system 1 related to a second embodiment.

FIG. 13 is a drawing showing the hardware configuration of a computer system 1 related to a second embodiment. Like reference signs may be assigned to components that are the same as those in the first embodiment, and descriptions thereof may be omitted.

In this embodiment, the LSI 3 is mounted in the host 2 as a host 2-side interface. This embodiment will be described in detail hereinbelow. The storage controller 4 has processors 6a and 6b that are connected to one another via a bus. By adopting this configuration, for example, even when a failure causes either of the processors 6a or 6b or caches 41a or 41b to stop operating, a storage operation can be continued by using the other processor 6 and cache 41. In this embodiment, memories 43a and 43b are respectively connected to the processors 6a and 6b via a bus. The processors 6a and 6b each have a switch and a processor core, and the switch is connected to the LSI 3 and the memories 43a and 43b. In the drawing, there are two processors 6 and memories 43, but there may be three or more. There may also be a plurality of processors 21 and LSIs 3 in the host 2, and there may be a plurality of hosts 2. Areas for caches 41a and 41b, directories 42a and 42b, and buffers 44a and 44b are reserved in each of the memories 43a and 43b. The processing is as described in the first embodiment, and the LSI 3 uses a path 7a that goes through the switch inside the processor 6a when accessing the directory 42a and the memory 43a. Also, the LSI 3 uses a path 7b that goes through the switch inside the processor b when accessing the cache directory 42b and the memory 43b.

In accordance therewith, the paths from the LSI 3 to the respective memories 43a and 43b are symmetrical, and the throughput of the computer system 1 remains the same no matter which path is selected. Thus, all of the resources can be used efficiently by simply distributing the processing equally. In addition, in a conventional dual controller mode, after data has been stored by the processor on the one side, the data is copied to the other side. According to this embodiment, reducing the flow of data between the processor 6a and the processor 6b leads to improved performance compared to a conventional system. Also, the provision of the LSI 3 on the server side makes it possible to assure redundancy between the server and the storage, and contributes toward improved reliability. In addition, in this configuration, it is also possible to couple the server to the storage using a PCIe system. According to this system, there are fewer decreases in IO bandwidth than in a system that is connected using an ordinary fibre channel or the like, and performance deterioration resulting from the exchange of data can be reduced.

The flow in this configuration when one of the paths 7a, 7b becomes unusable due to a hardware failure or the like will be described. As an example, when processing using path 7a has failed, either the LSI 3 or the storage controller 4 is configured to determine that path 7a cannot be used. When the LSI 3 recognizes a malfunction, the LSI 3 notifies the storage controller 4. When path 7a is unusable, the LSI 3 is unable to access the cache 41a and the directory 42a, and for this reason, switches the subsequent flow to the processing flow in a case where one path 7a cannot be used. Specifically, the storage controller 4 changes the settings of the LSI 3 so that a request from the host 2 will be sent to the storage controller 4 via path 7b. Also, in indications for subsequent processes, when issuing a data write, read, confirmation, or other such indication, instructions are given so that processing is performed via path 7b.

When performing an operation with respect to the cache 41a and/or the directory 42a, the LSI 3 is configured to perform the operation using a path between the processors 6a and 6b (specifically, a path between the switch in the processor 6a and the switch in the processor 6b). For example, a write process is realized by the processor 6b reading data from the cache memory 41b and writing this data to the cache memory 41a. For a confirmation process, the processor core in the processor 6b sends a request to the processor core in the processor 6a, and the processor core in the processor 6a substitutes for the processor core in the processor 6b by performing the confirmation process. The same holds true for a directory 42 confirmation process.

Embodiment 3

A computer system 1 related to a third embodiment will be described next.

Figure 14:
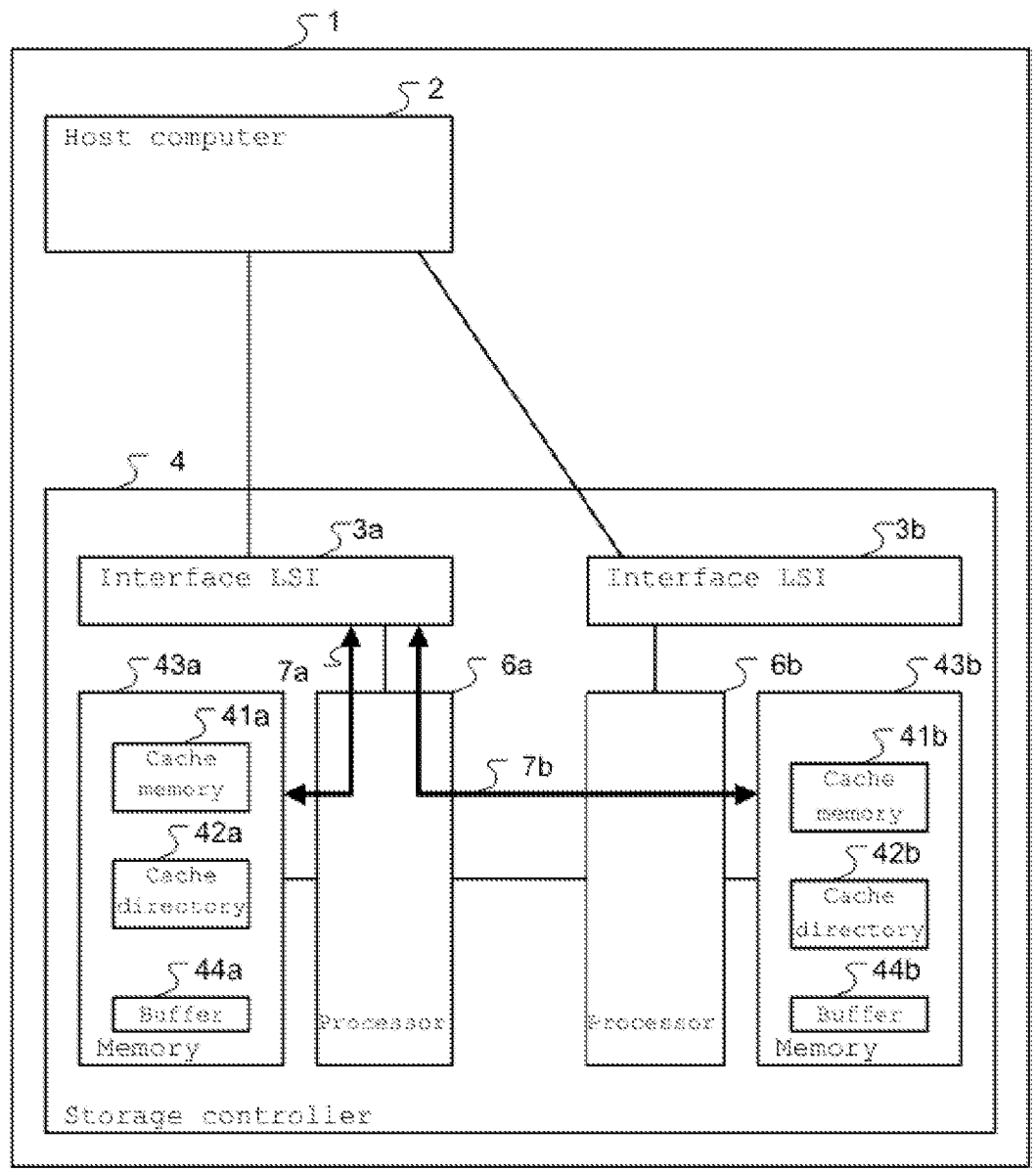
FIG. 14 is a drawing showing the hardware configuration of the computer system 1 related to a third embodiment.

FIG. 14 is a drawing showing the hardware configuration of a computer system 1 related to a third embodiment. Like reference signs may be assigned to components that are the same as those in the first and second embodiments, and descriptions thereof may be omitted.

In this embodiment, the LSI 3 is mounted in the storage controller 4 as a storage controller 4-side interface. This embodiment will be described in detail hereinbelow. The storage controller 4 has two LSIs 3a and 3b, LSI 3a is coupled to the switch in processor 6a, and LSI 3b is coupled to the switch in processor 6b. In the drawing, there are two each processors 6a and 6b, memories 43a and 43b, and LSIs 3a and 3b, but there may be three or more. The LSI 3a uses path 7a via the switch in processor 6a when accessing the memory 43a, and uses the path 7b via the switch in the processor 6a and the switch in the processor 6b when accessing the memory 43b.

This makes it possible to integrate the LSI 3, which cooperates closely with the processor 6, inside the storage controller 4. Thus, the independence of the host 2 and the storage controller 4 can be enhanced, thereby facilitating design and maintenance.

This makes it possible for the LSI 3 to perform the brunt of the processing for a read/write request from the host 2 in accordance with an indication from the processor 6. The involvement of the processor 6 in consecutive processes decreases, and the access requests that the processor 6 is able to process increase. As a result, the performance of the storage controller 4 is improved, and the time from a read/write request from the host 2 until a completion response is reduced, thereby improving the processing capabilities of the host 2 as well. This improves the processing capabilities of the computer system 1. Also, a confirmation process for guaranteeing that data is being stored correctly, and the same functions as heretofore for additional processing, such as a remote copy and/or a snapshot, can be maintained at this time. This makes it possible to improve the performance of the computer system 1 while maintaining high reliability and high functionality.

REFERENCE SIGNS LIST

1 Computer system
2 Host computer
3 Interface LSI
4 Storage controller

The invention claimed is:

1. A computer system, comprising:
a storage controller for controlling input and output of data to and from a storage device, the storage controller having a plurality of temporary storage areas and a processor that executes an arithmetic logical unit which performs arithmetic processing; and
an interface device that is coupled to the storage controller and is configured to send to the storage controller either a read request or a write request from a host computer,
wherein the processor, upon the storage controller receiving either the read request or the write request, is configured to send the interface device either a read-support indication, which is an indication to execute either a portion or all of read processing for read-data conforming to the read request, or a write-support indication, which is an indication to execute either a portion or all of write processing for write-data conforming to the write request, and
wherein the interface device is configured to:
execute either all or a portion of the read processing for the read-data, or all or a portion of the write processing for the write-data in accordance with either the read-support indication or the write-support indication from the storage controller; and
send to the host computer either a first response to the effect that the read processing has been completed, or a second response to the effect that the write processing has been completed,
wherein the write processing includes a temporary storage write process for writing the write-data to each of the plurality of temporary storage areas, and a confirmation process for confirming the correctness of write-data that has been written to the plurality of temporary storage areas,
wherein the write-support indication includes a first write-support indication, which is an indication to execute the temporary storage write process, and a second write-support indication, which is an indication to execute the confirmation process, and
wherein the interface device is further configured to:
execute temporary storage write processing for writing, in accordance with the first write-support indication specifying a plurality of addresses in the temporary storage areas, the write-data to each of the specified addresses, and
execute confirmation processing for confirming, in accordance with the second write-support indication, that the write-data is correctly stored in each of the temporary storage areas.

2. The computer system according to claim 1, wherein, in the confirmation processing, the interface device is further configured to:
send a notification to the storage controller indicating that the confirmation process has been successful, and, in addition, send the second response to the host computer when the write-data stored in each of the temporary storage areas has been confirmed to be correctly stored; and
send a notification to the storage controller indicating that the confirmation process has been a failure when the write-data stored in each of the temporary storage areas has not been confirmed to be correctly stored.

3. The computer system according to claim 2, wherein the storage controller is further configured to send to the interface device the first write-support indication and the second write-support indication targeted at a free area in one of the plurality of temporary storage areas when old data to be updated using the write-data resides in the plurality of temporary storage areas, and
the interface device is further configured to:
write the write-data to the target free area in accordance with the first write-support indication, and perform confirmation processing for the target free area in accordance with the second write-support indication; and
overwrite the old data that resides in the plurality of temporary storage areas with the write-date stored in the free area when the confirmation processing is successful.

4. The computer system according to claim 1, wherein the interface device resides in the host computer.

5. The computer system according to claim 1, wherein
each of the plurality of temporary storage areas is configured to store management information for data stored in the temporary storage areas, and additional information denoting information as to whether or not additional processing is required with respect to the storage devices,
the write process further includes an update process for updating the management information, and an additional process for performing a prescribed process with respect to the storage device, and
the processor in the storage controller is further configured to:
send to the interface device a third write-support indication, which is an indication to execute the update process after the temporary storage write process and the confirmation process, when a determination has been made that old data, which corresponds to the write-data and is to be updated using the write-data, does not reside in the plurality of temporary storage areas and that additional processing is not required in the storage device that stores the data; and
execute the additional process and the update process after the temporary storage write process and the confirmation process have been performed when the determination has been made that old data does not reside in the plurality of temporary storage areas, and that additional processing is required in the storage device that stores the data.

6. The computer system according to claim 1, wherein
the interface device resides in the host computer;
the processor has a first processor and a second processor;
the temporary storage areas include a first temporary storage area and a second temporary storage area; and
the interface device is further configured to access the first temporary storage area associated with the first processor via a first path, and to access the second temporary storage area associated with the second processor via a second path.

7. The computer system according to claim 6, wherein, when the first path is unable to be used, the second processor is configured to:
    notify the interface device to switch to a mode corresponding to the first path in an unusable state, and
    store the write-data received via the second path in the first temporary storage area via the first processor.

8. The computer system according to claim 1, wherein the confirmation process includes issuing to the storage controller a read command specifying a write-destination logical area of the write-data.

9. The computer system according to claim 1, wherein
    metadata is attached to the write-data, and the metadata includes reference information, which is information including one or more write-destination logical addresses of the write-data,
    the write request includes the write-destination logical addresses of the write-data, and
    the confirmation process includes reading each of the logical addresses in the reference information in the metadata attached to the write-data from the temporary storage areas, and comparing each of the read logical addresses to the write-destination logical addresses included in the write request.

10. The computer system according to claim 9, wherein
    the metadata further includes one or more error codes for the write-data, and
    the confirmation process further includes reading each of the error codes in the metadata attached to the write-data from the plurality of temporary storage areas, and comparing each of the read error codes to one or more error codes calculated from the write-data.

11. A method executed by a computer system having:
    a storage controller configured to control input and output of data to and from a storage device, and having a plurality of temporary storage areas and a processor that executes an arithmetic logical unit which performs arithmetic processing, and
    an interface device that is coupled to the storage controller and is configured to send to the storage controller either a read request or a write request from a host computer,
    the method comprising:
    operating the processor to send to the interface device either a read-support indication, which is an indication to execute either a portion or all of read processing for read-data conforming to the read request, or a write-support indication, which is an indication to execute either a portion or all of write processing for write-data conforming to the write request when the storage controller receives either the read request or the write request;
    operating the interface device to execute either all or a portion of the read processing for the read-data, or all or a portion of the write processing for the write-data in accordance with either the read-support indication or the write-support indication from the storage controller; and
    operating the interface device to send to the host computer either a first response to the effect that the read processing has been completed, or a second response to the effect that the write processing has been completed,
    wherein the write processing includes a temporary storage write process for writing the write-data to each of the plurality of temporary storage areas, and a confirmation process for confirming the correctness of write-data that has been written to the plurality of temporary storage areas,
    wherein the write-support indication includes a first write-support indication, which is an indication to execute the temporary storage write process, and a second write-support indication, which is an indication to execute the confirmation process, and
    wherein the interface device is further operated to:
    execute temporary storage write processing for writing, in accordance with the first write-support indication specifying a plurality of addresses in the temporary storage areas, the write-data to each of the specified addresses, and
    execute confirmation processing for confirming, in accordance with the second write-support indication, that the write-data is correctly stored in each of the temporary storage areas.

12. The method according to claim 11, wherein, in the confirmation processing, the interface device is further operated to:
    send a notification to the storage controller indicating that the confirmation process has been successful, and, in addition, send the second response to the host computer when the write-data stored in each of the plurality of temporary storage areas has been confirmed to be correctly stored; and
    send a notification to the storage controller indicating that the confirmation process has been a failure when the write-data stored in each of the plurality of temporary storage areas has not been confirmed to be correctly stored.

13. The method according to claim 12, further comprising:
    operating the storage controller to send to the interface device the first write-support indication and the second write-support indication targeted at a free area in one of the plurality of temporary storage areas when old data to be updated using the write-data resides in the plurality of temporary storage areas;
    operating the interface device to write the write-data to the target free area in accordance with the first write-support indication, and to perform confirmation processing for the target free area in accordance with the second write-support indication; and
    operating the interface device to overwrite the old data that resides in the plurality of temporary storage areas with the write-date stored in the free area when the confirmation processing is successful.

* * * * *